(12) United States Patent
Yamamoto

(10) Patent No.: US 6,532,397 B1
(45) Date of Patent: Mar. 11, 2003

(54) APPARATUS FOR TAKING OUT MOLDED PRODUCTS

(75) Inventor: Koji Yamamoto, Kyoto (JP)

(73) Assignee: Kabushiki Kaisha Yushin Seiki, Kyoto-fu (JP)

( * ) Notice: Subject to any disclaimer, the term of this patent is extended or adjusted under 35 U.S.C. 154(b) by 0 days.

(21) Appl. No.: 09/577,480

(22) Filed: May 25, 2000

(30) Foreign Application Priority Data

May 31, 1999 (JP) ............................................ 11-151995

(51) Int. Cl.[7] ............................................... G06F 19/00
(52) U.S. Cl. ........................... 700/197; 700/61; 700/63; 700/69; 700/198; 700/201; 700/204; 29/848; 29/849; 425/149; 359/683; 359/684; 359/694
(58) Field of Search ............................. 700/12, 13, 28, 700/27, 32, 34, 35, 40, 46, 61, 63, 64, 69, 70–71, 197–199, 200, 201, 202, 204; 29/848, 849; 425/149; 359/683, 684, 694

(56) References Cited

U.S. PATENT DOCUMENTS

| 4,802,097 | A |   | 1/1989  | Tanaka et al. |         |
|-----------|---|---|---------|---------------|---------|
| 4,823,274 | A |   | 4/1989  | Kiya et al.   |         |
| 5,550,744 | A | * | 8/1996  | Steinbichler  | 365/189.02 |
| 5,786,999 | A | * | 7/1998  | Spahr et al.  | 700/197 |
| 6,000,831 | A | * | 12/1999 | Triplett      | 264/328.1 |
| 6,128,548 | A | * | 10/2000 | Wideman et al. | 700/197 |
| 6,185,477 | B1 | * | 2/2001  | Palm et al.  | 700/18  |
| 6,311,101 | B1 | * | 10/2001 | Kastner      | 700/17  |
| 6,377,863 | B1 | * | 4/2002  | Koontz et al. | 700/197 |

FOREIGN PATENT DOCUMENTS

| DE | 4110948 A1 | 10/1992 |
|----|------------|---------|
| JP | 63-246220  | 10/1988 |
| JP | 6-64015    | 3/1994  |

* cited by examiner

Primary Examiner—Ramesh Patel
(74) Attorney, Agent, or Firm—Fitch, Even, Tabin & Flannery

(57) ABSTRACT

An object is to reduce damage to the mechanical parts of a moving mechanism unit 5 for moving a retaining mechanism unit 7 and electric power consumption in an apparatus for taking out a molded product. The apparatus comprises a time measuring unit 4 for measuring a return time elapsing between a start of the returning operation of the retaining mechanism unit 7 in a preceding process and the next start of the penetrating operation for taking out a molded product; an arithmetic operation unit 11 for calculating a return moving speed distribution for a process succeeding the preceding process such that the returning operation terminates upon elapse of the return time measured by the time measuring means 4; and a control unit 12 for activating the moving mechanism unit 5 in such a way that the returning operation is carried out according to the return moving speed distribution in the succeeding process.

11 Claims, 7 Drawing Sheets

APPARATUS FOR TAKING OUT MOLDED PRODUCTS

BACKGROUND OF THE INVENTION

1. Field of the Invention

The present invention relates to an apparatus for taking out a molded product by letting the retaining mechanism unit for retaining a molded product penetrate between the die halves after die opening, for instance, in an injection molding machine.

2. Disclosure of the Prior Art

The basic operation of an injection molding machine of the above type is as follows. Resin is injected into a mold cavity subsequently to clamping of the die halves and after the resin has been cooled, the die halves are opened. Thereafter, a molded product is taken out by a take-out apparatus such as a product take-out robot and then, the die halves are again clamped. Such an operation is repeatedly carried out.

Take-out of a molded product is performed by a take-out apparatus for a molded product, which has a retaining mechanism unit for retaining a molded product and a moving mechanism unit for moving the retaining mechanism unit.

The take-out operation of the take-out apparatus for a molded product is carried out in the way shown in FIG. 6. Specifically, after die opening, the retaining mechanism unit which has been stopping at a waiting position (A) penetrates to an penetrating position (B) within the die halves. Then, the retaining mechanism unit moves toward a take-out position (C) and stops upon arrival at the take-out position (C) (① penetration process). At the take-out position (C), the retaining mechanism unit retains the molded product which has been separated from a die half (② take-out process). The retaining mechanism unit with the molded product retained moves back to a specified pulling out position (D) from the take-out position (C). After moving to a withdrawing position (E) (③ withdrawal process), the retaining mechanism unit moves from the withdrawing position (E) to a retrieving position (F) where it liberates the molded product and when reaching the retrieving position (F), the retaining mechanism unit stops (④ conveyance process). At the retrieving position (F), the molded product is released from holding by the retaining mechanism unit so that the molded product can be retrieved (⑤ liberation process). Upon completion of liberating the molded product at the retrieving position (F), the retaining mechanism unit returns from the retrieving position (F) to the waiting position (A) (⑥ return process) where the retaining mechanism unit waits until the next take-out operation for a molded product starts (⑦ waiting process).

A time chart for the above processes (see FIG. 7) is constituted by the penetration/withdrawal time Tae (FIG. 7(a)) which is required for the penetration process and the withdrawal process; the conveyance time Tef (FIG. 7(b)) required for the conveyance process; the molded product liberation time Tf (FIG. 7(c)) required for liberation at the retrieving position (F); the return time Tfa (FIG. 7(d)) required for the return process and the wait time Ta (FIG. 7(e)) required for waiting at the waiting position (A).

Conventionally, in the return process in which the retaining mechanism unit which has liberated the molded product returns from the retrieving position (F) to the initial waiting position (A), the returning operation is set by the operator such that the retaining mechanism unit can move as fast as possible. This is because a sufficient wait time is ensured for the retaining mechanism unit when waiting at the waiting position (A) in order that the retaining mechanism unit should penetrate between the die halves immediately after completion of the next die opening thereby executing the penetration process without fail. For completing the return process quickly, it is necessary to increase the moving speed of the retaining mechanism unit, which involves rapid acceleration and rapid deceleration. The moving mechanism unit is therefore activated abruptly, entailing strong impact on the moving mechanism unit. As a result, there arise the problems of damage to the mechanical parts at an early stage and increased electric power consumption.

SUMMARY OF THE INVENTION

A prime object of the invention is to reduce damage to the mechanical parts of a moving mechanism unit and electric power consumption in an apparatus for taking out a molded product, the apparatus comprising a retaining mechanism unit for retaining a molded product and a moving mechanism unit for moving the retaining mechanism unit, the apparatus being designed such that the retaining mechanism unit penetrates between die halves from a specified waiting position after die opening to take out the molded product and the molded product is liberated at a specified retrieving position which is located outside the die halves.

The above object can be accomplished by an apparatus for taking out a molded product constructed according to the invention, the apparatus comprising:

time measuring means for measuring return time in a preceding process, the return time elapsing between a start of returning operation in which the retaining mechanism unit returns to the waiting position from the retrieving position and the next start of penetrating operation in which the retaining mechanism unit penetrates between die halves from the waiting position to take out the molded product;

arithmetic means for calculating a return moving speed distribution for a process succeeding the preceding process such that the returning operation is completed upon elapse of the return time measured by the time measuring means; and controlling means for activating the moving mechanism unit in such a way that the returning operation is carried out in the succeeding process according to the return moving speed distribution.

The above technical means functions in the following way.

In the molded product take-out operation of the preceding process (i.e., initializing operation) which is firstly carried out, the retaining mechanism unit which has liberated the molded product at the retrieving position is moved from the retrieving position to the waiting position by carrying out returning operation with the moving mechanism unit, and the retaining mechanism unit temporarily stops and waits at the waiting position until completion of die opening. At that time, the return time taken for the returning operation and the wait time at the waiting position are measured by the time measuring means, and then, a return moving speed distribution which allows the returning operation to be carried out within the measured return time is calculated by the arithmetic means. The moving speed in the return moving speed distribution calculated herein includes the wait time for the preceding process so that the moving speed can be made slower than that of the conventional system in which a wait time is assured. In consequence, moderate acceleration and deceleration can be carried out in the invention. In the returning operation in the succeeding process which takes place after the preceding process, wait time substantially vanishes because the moving mechanism unit is activated based on an instruction from the controlling means according to the return moving speed distribution calculated by the arithmetic means, so that the activation of the moving mechanism unit at that time can be performed at a moderate speed.

The invention is designed as described above and therefore exerts the following effects.

In the apparatus for taking out a molded product according to the invention, the retaining mechanism unit is arranged such that its moving speed in returning operation is reduced thereby moderating acceleration and deceleration to slowly activate the moving mechanism unit, whereby damage to the mechanical parts of the moving mechanism unit and electric power consumption can be restricted. In consequence, the service life of the apparatus can be prolonged and the cost of electric power consumption can be reduced.

The above object can be also achieved by the arrangement wherein: the retaining mechanism unit takes the molded product out of the die halves and performs conveying operation in which the molded product is conveyed from a specified withdrawing position located outside the die halves to the retrieving position;

the time measuring means also measures the conveyance time required for the conveying operation;

the arithmetic means calculates a moving speed distribution for the conveying operation and a moving speed distribution for the returning operation based on the total time of the conveyance time and the return time; and the controlling means activates the moving mechanism unit so as to carry out the conveying operation and the returning operation according to the moving speed distributions. This arrangement moderates not only acceleration and deceleration in the returning operation but also acceleration and deceleration in the conveying operation, so that damage to the mechanical parts of the moving mechanism unit and electric power consumption can be further lessened.

Other objects, features, aspects and advantages of the invention will become more apparent from the following detailed description of embodiments with reference to the accompanying drawings and claims.

DETAILED DESCRIPTION OF THE EMBODIMENTS

Figure 1:
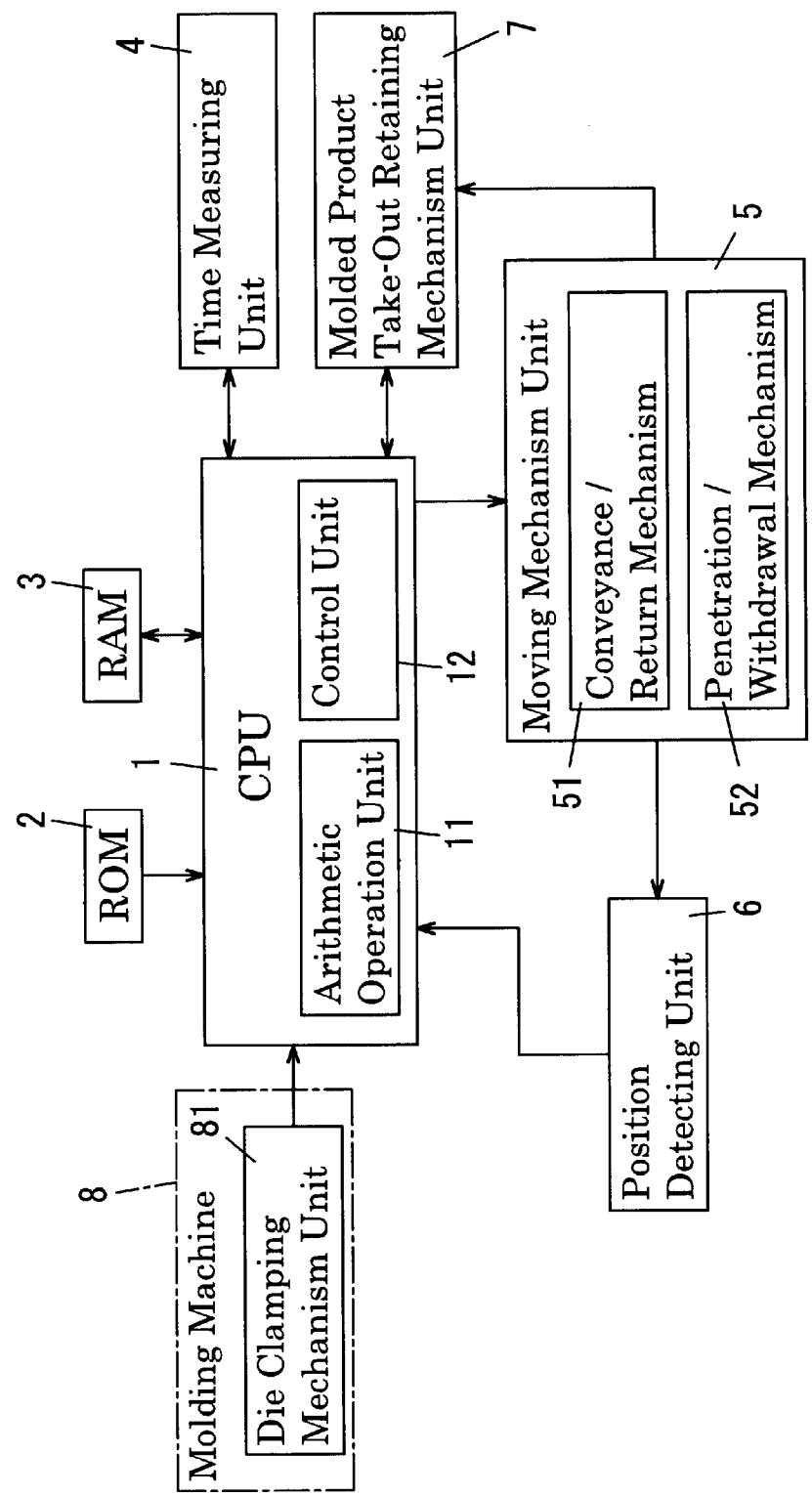
FIG. 1 is a block diagram showing the structure of an apparatus for taking out a molded product according a first embodiment of the invention.

Referring now to the drawings, a first embodiment of the invention will be hereinafter described.

First Embodiment

FIG. 1 is a block diagram showing the structure of an apparatus for taking out a molded product constructed according to the first embodiment of the invention. Referring to FIG. 1, the molded product take-out apparatus of the first embodiment comprises a retaining mechanism unit 7 for taking a molded product out of die halves and a moving mechanism unit 5 for moving the retaining mechanism unit 7. It further comprises a time measuring unit 4, a position detecting unit 6 and a CPU (Central Processing Unit) 1.

Although not shown in the drawings, the retaining mechanism unit 7 is composed of a take-out arm and a take-out head attached to the distal end of the take-out arm. By means of the take-out head, a molded product is retained by adsorption, chucking or clamping. The proximal end of the take-out arm is connected to the moving mechanism unit 5.

The moving mechanism unit 5 includes a conveyance/return mechanism 51 and a penetration/withdrawal mechanism 52.

In the first embodiment, the conveyance/return mechanism 51 allows the traversing movement of the retaining mechanism unit 7, thereby performing conveying operation (conveyance process) for conveyance from a withdrawing position (E) to a retrieving position (F) (see FIG. 6) and returning operation (return process) for returning from the retrieving position (F) to a waiting position (A). The penetration/withdrawal mechanism 52 allows the ascending/descending movement of the retaining mechanism unit 7, thereby performing penetrating operation (penetration process) for penetration from the waiting position (A) to a take-out position (C) and withdrawing operation (withdrawal process) for withdrawal from the take-out position (C) to the withdrawing position (E).

The position detecting unit 6 detects the movement position of the retaining mechanism unit 7 based on the driving amount of the moving mechanism unit 5, and it is determined whether the retaining mechanism unit 7 has reached each of the waiting position (A), the penetrating position (B), the take-out position (C), the pulling out position (D), the withdrawing position (E) and the retrieving position (F).

The time measuring unit 4 measures the return time elapsing since a start of the return process in the preceding process (i.e., initializing operation) until a start of the penetration process which is carried out subsequently to a completion of the waiting process. This return time is measured by counting clock signals sent from the CPU 1.

The CPU 1 controls the overall take-out apparatus based on a program prestored in a ROM 2. The CPU 1 performs signal processing to instruct activation of the moving mechanism unit 5, based on a signal from a die clamping mechanism unit 81 in a molding machine 8, a positional detection signal from the position detecting unit 6 and data stored in a RAM 3. The CPU 1 has an arithmetic operation unit 11 having a learning function and the arithmetic operation unit 11 calculates a return moving speed distribution which allows the return process to be completed upon elapse of the return time measured by the time measuring unit 4.

The CPU 1 contains a control unit 12 which activates the moving mechanism unit 5 such that the return process in the process succeeding the preceding process is performed according to the return moving speed distribution calculated by the arithmetic operation unit 11. Since the moving speed based on the return moving speed distribution calculated herein includes the wait time of the preceding process, it can be slower than the moving speed of the return process in the preceding process in which a wait time is assured, so that moderate acceleration and deceleration can be carried out.

Next, there will be explained the operation of the apparatus for taking out a molded product according to the first embodiment of the invention.

Figure 6:
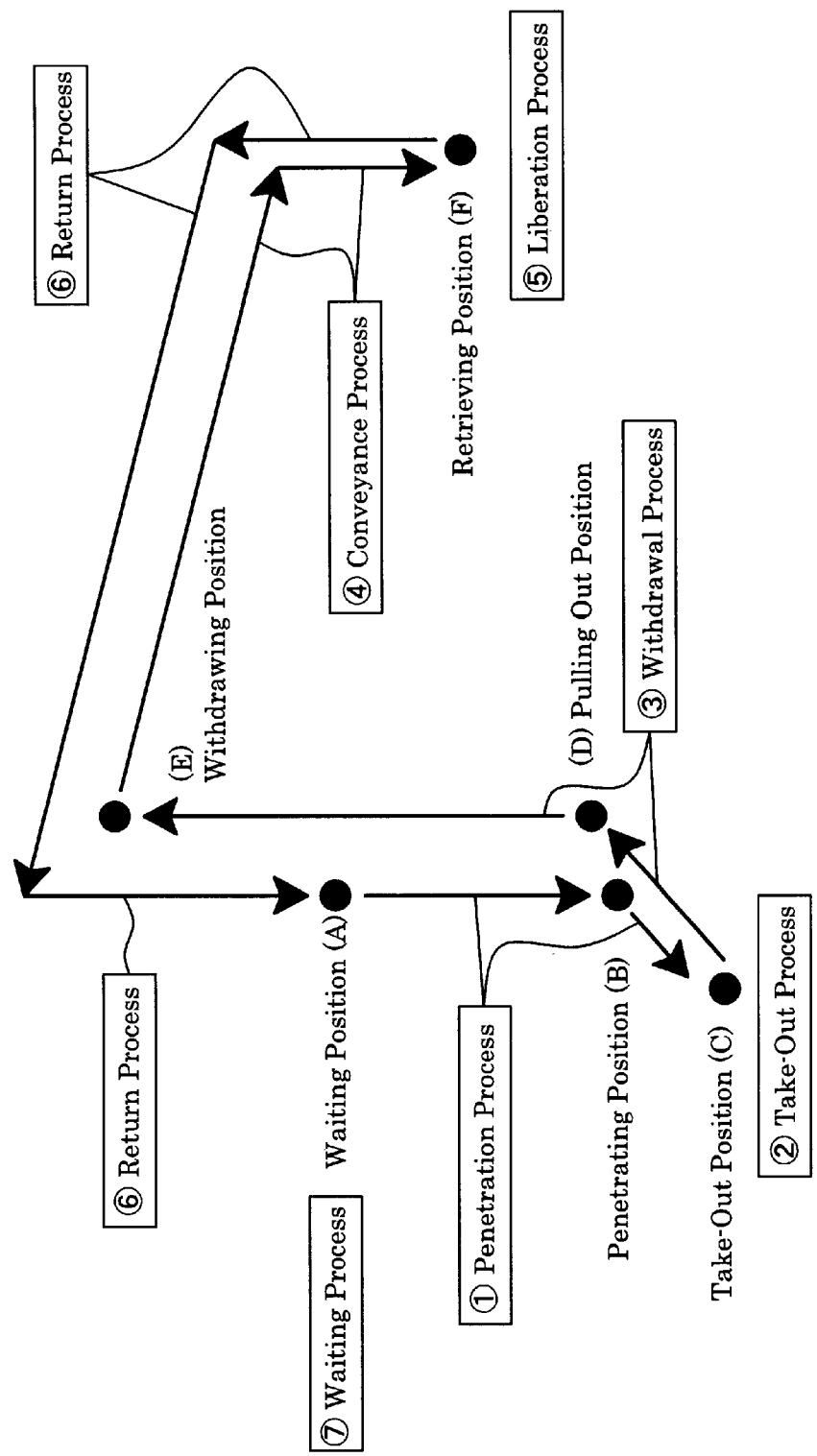
FIG. 6 is an operation chart showing the basic actions of the take-out operation of the apparatus for taking out a molded product.
Figure 7:
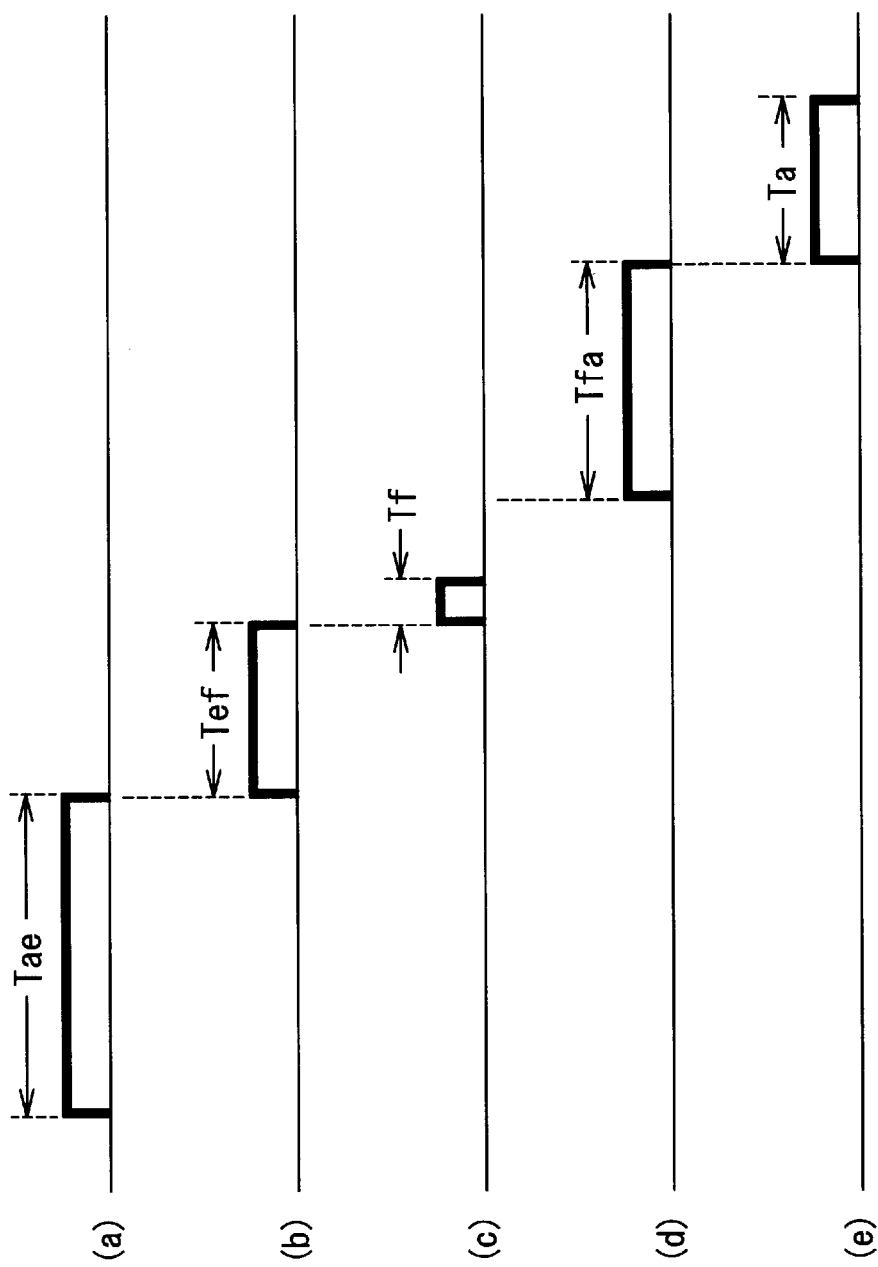
FIG. 7 is a time chart of a take-out operation in a prior art take-out apparatus.

Referring to FIG. 6, the basic operations (described earlier) of the present take-out apparatus are carried out in the following order: (1) penetration process (penetrating operation) →(2) take-out process (molded product retaining operation)→(3) withdrawal process (withdrawing operation)→(4) conveyance process (conveying operation→(5) liberation process (liberating operation)→(6) return process(returning operation)→(7) waiting process. In (1) penetration process, (3) withdrawal process, (4) conveyance process and (6) return process among the above processes, the moving mechanism unit 5 is operated. The moving speed in each process is so set beforehand by the operator that each process can be finished in good time for starting the next molding cycle. The return process is carried out quickly in order to perform the penetration process in the next molding cycle without fail and assures sufficient wait time in the waiting process. In the first embodiment, the return process in the process succeeding the preceding process (initializing operation) is performed by the learning function of the CPU 1 such that the above wait time can be vanished. The initializing operation for that is shown in the flow chart of FIG. 2.

Figure 2:
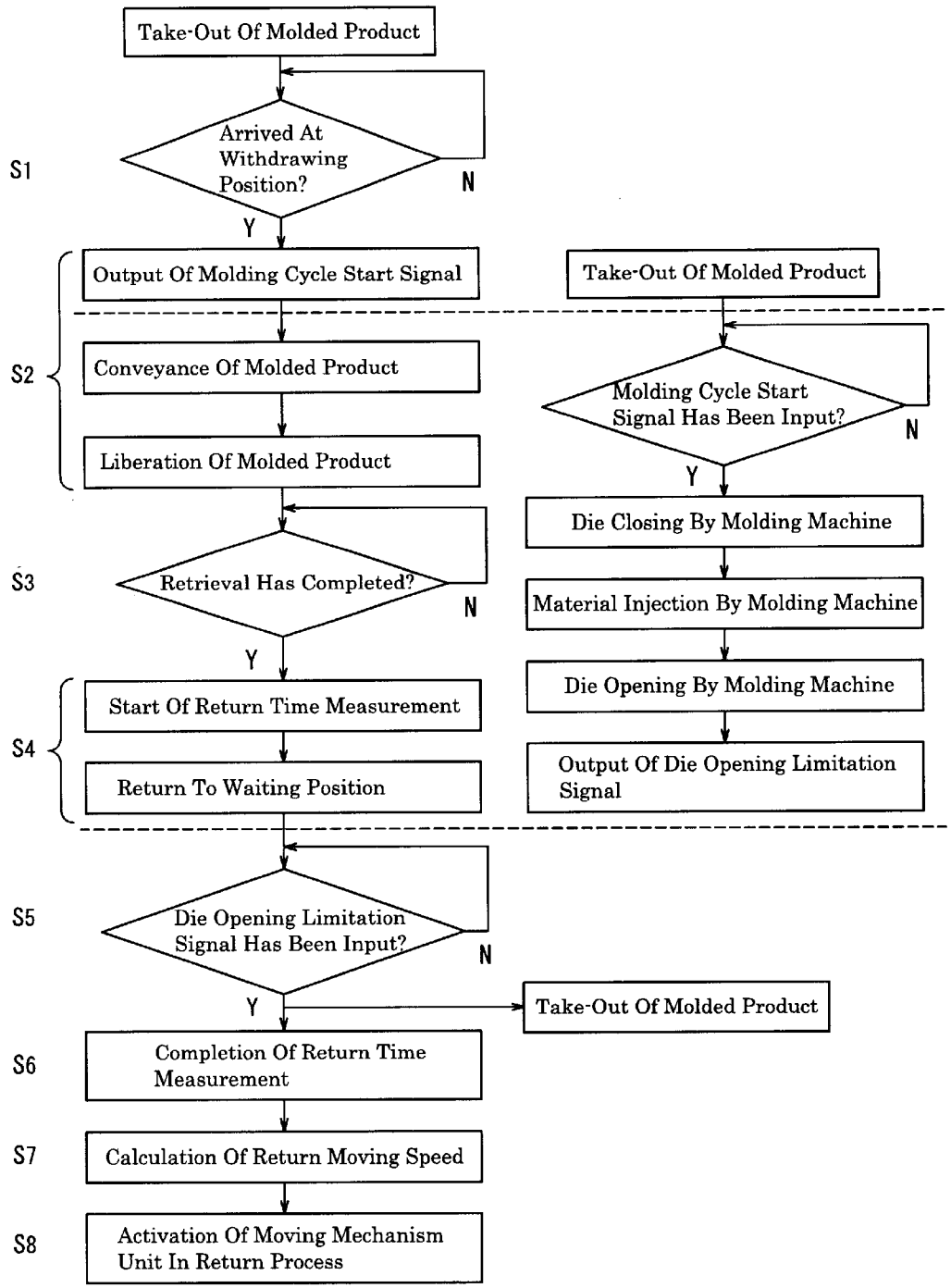
FIG. 2 is a flow chart of an initializing operation for setting a return moving speed distribution for a return process.

Referring to FIG. 2, the initializing operation i.e., the preceding process is performed as follows: First, at Step S1, the molded product is taken out of the die halves and the withdrawing operation is executed. Then, a check is made to determine whether the retaining mechanism unit 7 has reached the withdrawing position (E) outside the die halves, and if it is determined that the unit 7 has reached, the program proceeds to Step S2.

Now that the retaining mechanism unit 7 has been withdrawn from the die halves, a molding cycle start signal is outputted to the molding machine at Step S2 to execute the next molding cycle. Subsequently, the conveying operation in which the retaining mechanism unit 7 holding the molded product is moved from the withdrawing position (E) to the retrieving position (F) and the liberating operation in which the molded product is liberated at the retrieving position (F) are successively executed, and then the program proceeds to Step S3. In the meantime, the molding machine which has input a molding cycle start signal performs die clamping, injection of material and die opening successively as a molding cycle and issues a die opening limitation signal upon completion of die opening.

At Step 3, the liberating operation in which the molded product is released from the retaining mechanism unit 7 is carried out at the retrieving position (F) within the liberation time set by a timer function provided for the CPU 1; a check is made to determine whether the liberation time has elapsed; and if the liberation time has elapsed, the liberating operation is completed. Then, if it is determined that the liberating operation has been completed, the program proceeds to the next step S4.

At Step S4, time measurement is carried out by the time measuring unit 4 while the returning operation is performed to return the retaining mechanism unit 7 to the waiting position (A). Thereafter, the retaining mechanism unit 7 waits at the waiting position (A) until the moment when it inputs a die opening limitation signal which is indicative of a completion of die opening and sent from the die opening mechanism unit 81 of the molding machine 8.

At Step S5, it is determined whether the die opening limitation signal has been input and if it is determined that the die opening limitation signal has been input, the penetrating operation of the next molding cycle starts to execute take-out of a molded product and the program proceeds to Step S6.

At Step S6, the measurement by the time measuring unit 4 is stopped and the total time (i.e., return time) of the return time taken for the returning operation and the wait time in the wait process is measured.

At Step S7, the arithmetic operation unit 11 of the CPU 1 calculates a return moving speed distribution which allows the returning operation to be terminated upon elapse of the return time which has been measured by the time measuring unit 4. The calculation of the return moving speed distribution is performed, for instance, according to the table shown in FIG. 3.

Figure 3:
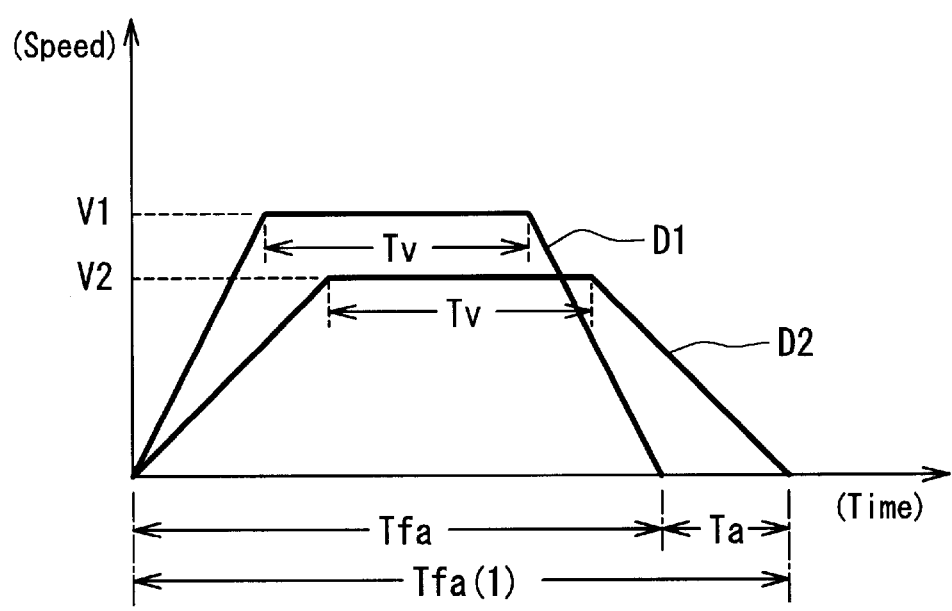
FIG. 3 is a table for showing a speed distribution used for calculating a return moving speed.

Referring to FIG. 3, the speed distribution of the moving speed V1 of the returning operation, which is set by the operator beforehand, is represented by a trapezoidal curve D1 constituted by an acceleration zone ascending diagonally to the right, an intermediate constant speed zone, and a deceleration zone descending diagonally to the right. The return time for the returning operation in this case is designated by Tfa. The wait time at the waiting position (A) is designated by Ta. The return time measured by the time measuring unit 4 is represented by Tfa+Ta=Tfa (1). As the speed distribution of the return moving speed V2 calculated herein, a trapezoidal curve D2 is determined which allows the returning operation to be terminated upon elapse of the return time Tfa (1). The method for determining the trapezoidal curve D2 of this embodiment is as follows: The lower base is set to the return time Tfa (1), whereas the upper base is equalized to the preset time Tv of the intermediate constant speed zone having the moving speed V1. Then, the height V2 is determined such that the area of the region enclosed by the trapezoidal curve D2 becomes equal to the area of the region enclosed by the trapezoidal curve D1. The height V2 represents the return moving speed. Accordingly, by making the area of the region enclosed by the trapezoidal curve D2 equal to the area of the region enclosed by the trapezoidal curve D1, the moving distance based on the trapezoidal curve D2 can be equalized to the moving distance based on the trapezoidal curve D1. This means that if the returning operation is carried out at the return moving speed V2 according to the trapezoidal curve D2, it takes the return time Tfa (1) after a start of the returning operation until a completion of the returning operation.

Then, the return moving speed distribution based on the trapezoidal curve D2 is calculated during the time between a start of the penetrating operation in which take-out of the molded product is executed at Step S5 and a start of the returning operation which is performed subsequently to the liberation of the molded product at the retrieving position (F).

Then, at Step S8, the conveyance/return mechanism 51 of the moving mechanism unit 5 is activated upon receipt of a command from the control unit 12 of the CPU 1, in such a way that the retaining mechanism unit 7, which has liberated the molded product at the retrieving position (F) and is about to start the returning operation, is moved according to the speed distribution of the return moving speed V2 which has been calculated at Step S7. This returning operation is carried out taking the return time Tfa (1) which has been calculated at Step S6. Therefore, the retaining mechanism unit 7 arrives at the waiting position (A) at the moment when the return time Tfa(1) has elapsed after the start of the returning operation.

Figure 4:
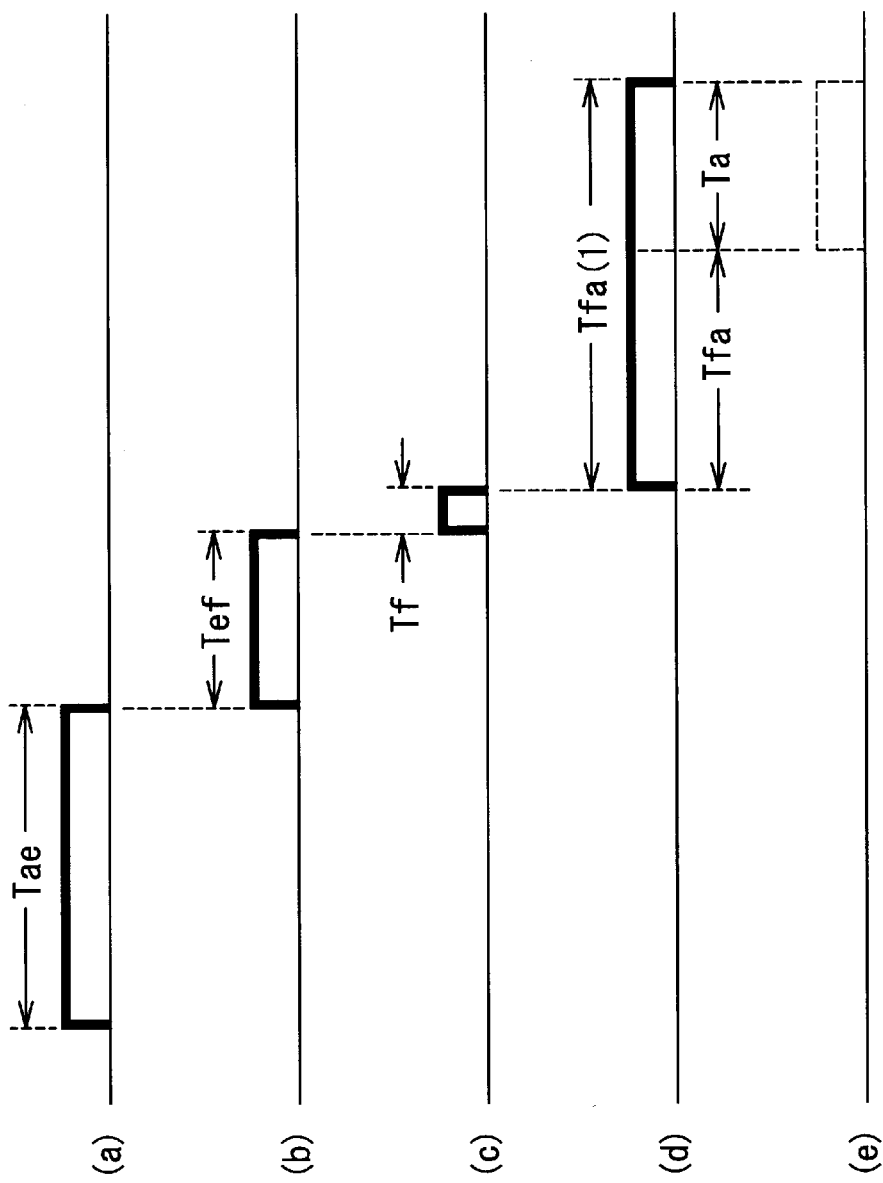
FIG. 4 is a time chart of a take-out operation performed at the calculated return moving speed.

The succeeding process takes place later in such a way that the retaining mechanism unit 7 is moved according to the return moving speed distribution based on the trapezoidal curve D2 in the return process and moved at a preset moving speed in other processes which are the penetration process, withdrawal process and conveyance process. In this way, (1) penetration process, (2) take-out process, (3) withdrawal process, (4) conveyance process, (5) liberation process, (6) return process and (7) waiting process are carried out in order. The time chart for these processes comprises, as shown in FIG. 4, the penetration/withdrawal time Tae (FIG. 4(a)) required for the penetration process and the withdrawal process, the conveyance time Tef (FIG. 4(b)) required for the conveyance process, the liberation process Tf (FIG. 4(c)) required for the liberation of the molded product at the retrieving position (F) and the return time Tfa(1) (FIG. 4(d)) required for the return process. The wait time Ta (FIG. 4(e)) required for waiting at the waiting position (A) is substantially eliminated from this time chart, because it is merged into the prior return process. Specifically, the return process takes the return time (Tfa(1)) and the retaining mechanism unit 7 therefore reaches the waiting position upon completion of die opening so that the retaining mechanism unit 7 only momentarily stops at the waiting position (A).

As described earlier, in the apparatus for taking out a molded product according to the embodiment 1, the speed distribution of the return moving speed V2 is calculated so as to include the wait time Ta of the preceding process which firstly takes place and therefore, the return moving speed V2 can be made slower than the moving speed V1 of the returning operation in which the wait time Ta is assured (V1>V2). As a result, acceleration and deceleration can be carried out moderately (see FIG. 3). In the returning operation in the process which succeeds the preceding process, the moving mechanism unit 5 is activated according to the speed distribution of the return moving speed V2 and therefore the wait time substantially vanishes, so that the activation of the moving mechanism unit 5 in this case can be carried out moderately. With this arrangement, damage to the mechanical parts of the moving mechanism unit 5 and electric power consumption can be restricted. Accordingly, an apparatus capable of providing longer service life and lower electric consumption can be attained.

Embodiment 2

In the second embodiment 2, the time measuring unit 4 further measures the conveyance time Tef in the conveying process. This measurement starts at a start of the conveying operation in the preceding process (i.e., initializing operation). The arithmetic operation unit 11 of the CPU 1 calculates moving speed distributions for the conveyance process and for the return process which are carried out, taking the total time (Tef+Tfa(1)) of the conveyance time Tef and the return time Tfa(1) (see FIG. 4). The control unit 12 of the CPU 1 actuates the conveyance/return mechanism 51 of the moving mechanism unit 5 such that the operations of the conveyance process and the return process are respectively carried out according to the above moving speed distributions.

Specifically, the time measuring unit 4 starts a time measurement upon input of a withdrawing position arrival signal which indicates that the retaining mechanism unit 7 has arrived at the withdrawing position (E) shown in FIG. 6 and which is sent from the position detecting unit 6. The time measuring unit 4 terminates the time measurement upon input of a die opening limitation signal similarly to the case of the first embodiment 1. The liberation time Tf required for liberation at the retrieving position (F) is included in the time measured herein and the liberation time Tf is given beforehand because it is preset by the timer function of the CPU 1. Therefore, the total time (Tef+Tfa(1)) of the conveyance time Tef and the return time Tfa(a) can be calculated by subtracting the liberation time Tf from the above measured time.

Figure 5:
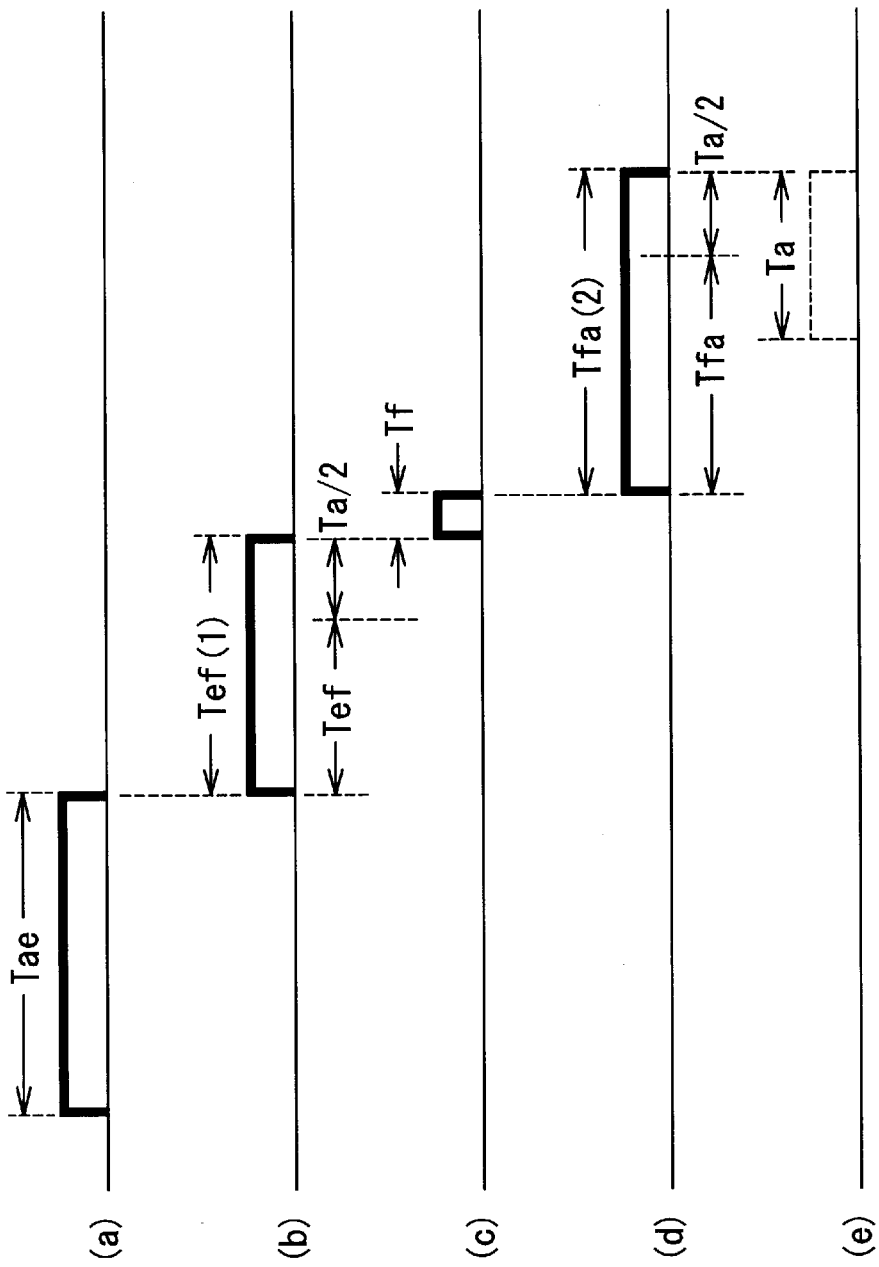
FIG. 5 is a time chart of a take-out operation performed at the calculated return moving speed according to a second embodiment.

Next, a specified time is allocated, according to the total time (Tef+Tfa(1)), to the conveyance time Tef(1) of the conveyance process and to the return time Tfa(2) of the return process. For example, in this embodiment, Ta/2 hours are allocated, as shown in the time chart of FIG. 5, to the conveyance time Tef(1) and the return time Tfa(2) respectively, Ta being the wait time calculated in accordance with the conveyance speed and return speed which are preset by the operator in the preceding process. Then, moving speed distributions in the form of trapezoidal curves such as shown in FIG. 3 are respectively calculated for the conveyance process and for the return process, based on the conveyance time Tef(1) and the return time Tfa(2). The conveyance speed of the conveyance process and the return speed of the return process are slower than their corresponding moving speeds preset by the operator and therefore acceleration and deceleration in question become moderate.

In the take-out operation in the process succeeding the preceding process, the conveyance/return mechanism 51 of the moving mechanism unit 5 is activated such that the operations in the conveyance process and the return process are carried out in accordance with the conveyance speed distribution and the return speed distribution calculated in the way described above.

As explained earlier, the second embodiment is arranged such that acceleration and deceleration can be carried out moderately not only in the returning operation of the return process but also in the conveying operation of the conveyance process so that damage to the mechanical parts of the moving mechanism unit 7 and electric power consumption can be still more restricted.

While the moving speed of the retaining mechanism unit 7 becomes zero and the retaining mechanism unit 7 momentarily stops at the waiting position (A) in the foregoing embodiments, an alternative arrangement may be employed in which the latter half of the return process is set as a wait area; the retaining mechanism unit 7 is moved at a speed slower than the return moving speed V2; the retaining mechanism unit 7 receives during its movement a command for starting the penetration process; and the retaining mechanism unit 7 does not stop at the waiting position (A). In this case, abrupt acceleration and abrupt deceleration can be accordingly restrained by making the retaining mechanism unit 7 wait while moving, so that damage to the mechanical part of the moving mechanism unit 7 and electric power consumption can be still more restricted similarly to the foregoing embodiments.

Although trapezoidal curves such as shown in FIG. 3 are used for the moving speed distributions in the foregoing embodiment, triangular curves, parabolic curves or the like which have no intermediate constant speed zone may be used.

While the foregoing embodiments have been explained with the concept of the so-called, traverse type in which the retaining mechanism unit 7 is lifted and lowered in order that the retaining mechanism unit 7 shall penetrate between and withdraw from the die halves in the penetration/withdrawal process, the so-called, side entry type may be adapted in which the penetration and withdrawal of the retaining mechanism unit 7 with respect to the die halves is carried out by the lateral movement of the retaining mechanism unit 7.

In addition, the invention is applicable to all types of injection molding machines which require removal of a molded product after die opening and examples of which are injection molding machines for producing molded products from resin and injection molding machines for producing molded products from magnesium or aluminum.

What is claimed is:

1. An apparatus for taking out a molded product, which comprises a retaining mechanism until for retaining a molded product and a moving mechanism unit for moving the retaining mechanism unit and wherein the retaining mechanism unit penetrates between die halves from a specified waiting position after die opening to take out the molded product and the molded product is liberated at a specified retrieving position which is located outside the die halves, the apparatus further comprising:

time measuring means for measuring return time in a preceding process, the return time elapsing between a start of returning operation in which the retaining mechanism unit returns to the waiting position form the retrieving position and the next start of penetrating operation in which the retaining mechanism unit penetrates between die halves from the waiting position to take out the molded product;

arithmetic means for calculating a return moving speed distribution for a process succeeding the preceding process wherein the returning operation is completed upon elapse of the return time measured by the time measuring means; and controlling means for activating the moving mechanism unit wherein the returning operation is carried out in the succeeding process according to the return moving speed distribution.

2. An apparatus for taking out a molded product according to claim 1, wherein the retaining mechanism unit takes the molded product out of the die halves and performs conveying operation in which the molded product is conveyed from a specified withdrawing position located outside the die halves to the retrieving position;

the time measuring means also measures the conveyance time required for the conveying operation;

the arithmetic means calculates a moving speed distribution for the conveying operation and a moving speed distribution for the returning operation based on the total time of the conveyance time and the return time; and the controlling means activates the moving mechanism unit to carry out the conveying operation and the returning operation according to the moving speed distributions.

3. An apparatus for taking out a molded product according to claim 1, wherein the return moving speed distribution calculated by the arithmetic means is a trapezoidal curve including an acceleration zone which ascends diagonally to the right, an intermediate constant speed zone and a deceleration zone which descends diagonally to the right.

4. An apparatus for taking out a molded product according to claim 3, wherein the calculation of the return moving speed distribution by the arithmetic means is carried out in terms of a trapezoidal curve which constitutes the return moving speed distribution, wherein the lower base is set to the return time;

the upper base is set equal to a present time for a constant speed zone of the returning operation of the retaining mechanism unit; and the height is determined whereby the area of a region enclosed by said trapezoidal curve is equal to the area of a region enclosed by a preset trapezoidal curve for the returning operation of the retaining mechanism unit.

5. An apparatus for taking out a molded product according to claim 2, wherein the calculation of the moving speed distributions by the arithmetic means is carried out so that;

the moving speed distribution for the returning operation is calculated based on a time obtained by adding one half a wait time elapsing between arrival of the retaining mechanism unit at the waiting position and a start of the penetration of the retaining mechanism unit with respect to the die halves to a time taken for the retaining mechanism unit to reach the waiting position from the retrieving position, said wait time and time taken for the retaining mechanism unit to reach the waiting position being included in the time measured by the time measuring means; and the moving speed distribution for the conveying operation is calculated based on a time obtained by adding one half said wait time to said conveyance time, said wait time and conveyance time being included in the time measured by the time measuring means.

6. An apparatus for taking out a molded product according to claim 1, wherein the latter half of the returning operation in the succeeding process is set as a wait area in which the retaining mechanism unit is moved at a speed slower than a moving speed according to the return moving speed distribution and the retaining mechanism unit receives, during its movement, a command for starting penetration between the die halves.

7. An apparatus for taking out a molded product according to claim 1, wherein said return moving speed distribution is in the form of a triangular curve which includes an acceleration zone ascending diagonally to the right and a deceleration zone descending diagonally to the right.

8. An apparatus for taking out a molded product according to claim 1, wherein said return moving speed distribution is in the form of a parabolic curve which includes an acceleration zone ascending diagonally to the right and a deceleration zone descending diagonally to the right.

9. An apparatus for taking out a molded product according to claim 1, wherein said retaining mechanism unit is of a traverse type in which the penetration and withdrawal of the retaining mechanism unit with respect to the die halves is carried out by lifting and lowering the retaining mechanism unit.

10. An apparatus for taking out a molded product according to claim 1, wherein said retaining mechanism unit is of a side entry type in which the penetration and withdrawal of the retaining mechanism unit with respect to the die halves is carried out by laterally moving the retaining mechanism unit.

11. An apparatus for taking out a molded product according to claim 1, which is applied to take-out of a molded product in an injection molding machine for producing a molded product from resin, magnesium or aluminum.

* * * * *